United States Patent [19]
Jurkiewicz

[11] 3,793,875
[45] Feb. 26, 1974

[54] METHOD AND APPARATUS FOR SENSING THE PRESENCE OF THREADS ON A SURFACE

[75] Inventor: Walter J. Jurkiewicz, Philadelphia, Pa.

[73] Assignee: Robertshow Controls Company, Richmond, Va.

[22] Filed: Feb. 18, 1972

[21] Appl. No.: 227,538

[52] U.S. Cl.............. 73/37.5, 73/37.9, 116/70, 137/831
[51] Int. Cl. ............................................ G01b 13/22
[58] Field of Search. 116/114, 65, 70, 117; 73/37.5, 73/37.9, 45.1; 137/831, 827, 229, 830; 235/201 PF

[56] References Cited
UNITED STATES PATENTS

| | | | |
|---|---|---|---|
| 3,423,990 | 1/1969 | Martin | 73/45.1 |
| 3,584,501 | 6/1971 | Marradi | 73/45.1 |
| 3,662,704 | 5/1972 | Dega | 116/70 |

Primary Examiner—Louis J. Capozi
Attorney, Agent, or Firm—Anthony A. O'Brien

[57] ABSTRACT

The method of determining the presence or absence of threads on a surface relies upon the difference in back pressure sensed by the probe of a fluidic system. Back pressure will be greater when the probe is inserted into an unthreaded bore or encompasses an unthreaded stud and will trigger an output indicating that no threads are present.

The apparatus for determining the presence or absence of threads on an object has no moving parts and includes a probe, a proportional center dump fluidic element connected to the probe and to a source of pressure, and a fluidic Schmitt trigger connected to amplify the output of the proportional element when the predetermined condition is sensed. Since the system operates on the difference in back pressure fed by the probe to the porportional element, it can be calibrated to generate an output signal indicating higher back pressure due to the absence of threads in a bore or on a stud.

9 Claims, 5 Drawing Figures

METHOD AND APPARATUS FOR SENSING THE PRESENCE OF THREADS ON A SURFACE

BACKGROUND OF THE INVENTION

1. Field of the Invention

The invention relates to the general field of testing for threads in a bore or on a stud and in particular to a fluidic system having no moving parts. The device operates basically as a back pressure sensor which senses the increased back pressure caused by the absence of threads in a bore or on a stud.

2. Description of the Prior Art

It has long been a problem in the field of manufacturing to determine whether or not a bore or a stud has been threaded and is ready to receive a screw, a bolt or a nut. While most tapping machinery will correctly tap a bore, occasionally a bore will not be threaded due to breakage of the tap or some other unforeseen event. In a similar fashion a stud may not be threaded. Whenever an unthreaded bore or stud arrives at a station where it is to receive a screw, bolt, or nut, a jamming of the machinery inevitably occurs resulting in expensive delays while the stoppage is cleared.

The known devices for sensing threads in a bore or on a stud have primarily relied upon optical or visual systems which are rather complicated and expensive.

SUMMARY OF THE PRESENT INVENTION

It is an object of the present invention to provide a method and apparatus for detecting the presence of threads in a bore or on a stud which utilizes a fluidic system having no moving parts and which, by back pressure sensing, accurately determines when the bore or stud is not threaded.

It is another object of the present invention to employ a fluidic device having a proportional center dump fluidic element attached to a probe in such manner that increased back pressure developed in an unthreaded bore or by an unthreaded stud will result in an output indicative of the sensed condition.

It is still another object of the present invention to provide a fluidic device which will amplify to a suitable level the signal generated by an unthreaded bore or stud to thus indicate whether or not the bore or stud is threaded.

It is also an object of this invention to provide a fluidic apparatus for determining the presence of threads in a bore or on a stud, which apparatus may be readily and economically produced.

The apparatus for sensing the presence of threads on a surface, such as in a bore or on a stud, includes a probe, a proportional center dump fluidic element connected to the probe and to a source of pressurized fluid, and a fluidic Schmitt trigger connected to amplify the output of the proportional element and provide an indication of the presence or absence of threads. The probe, in the case of bores, is sized for a close fit in the bore and has a radially directed opening. The probe used on studs is adapted to closely fit over that portion of the stud which should be threaded. The apparatus is operated in such manner that the increased back pressure resulting from a lack of threads on the unit under test will give an output indication of this condition.

Other objects and advantages of the present invention will become apparent from the following description of the preferred embodiment taken in conjunction with the accompanying drawings.

DESCRIPTION OF THE PREFERRED EMBODIMENT

Figure 1:
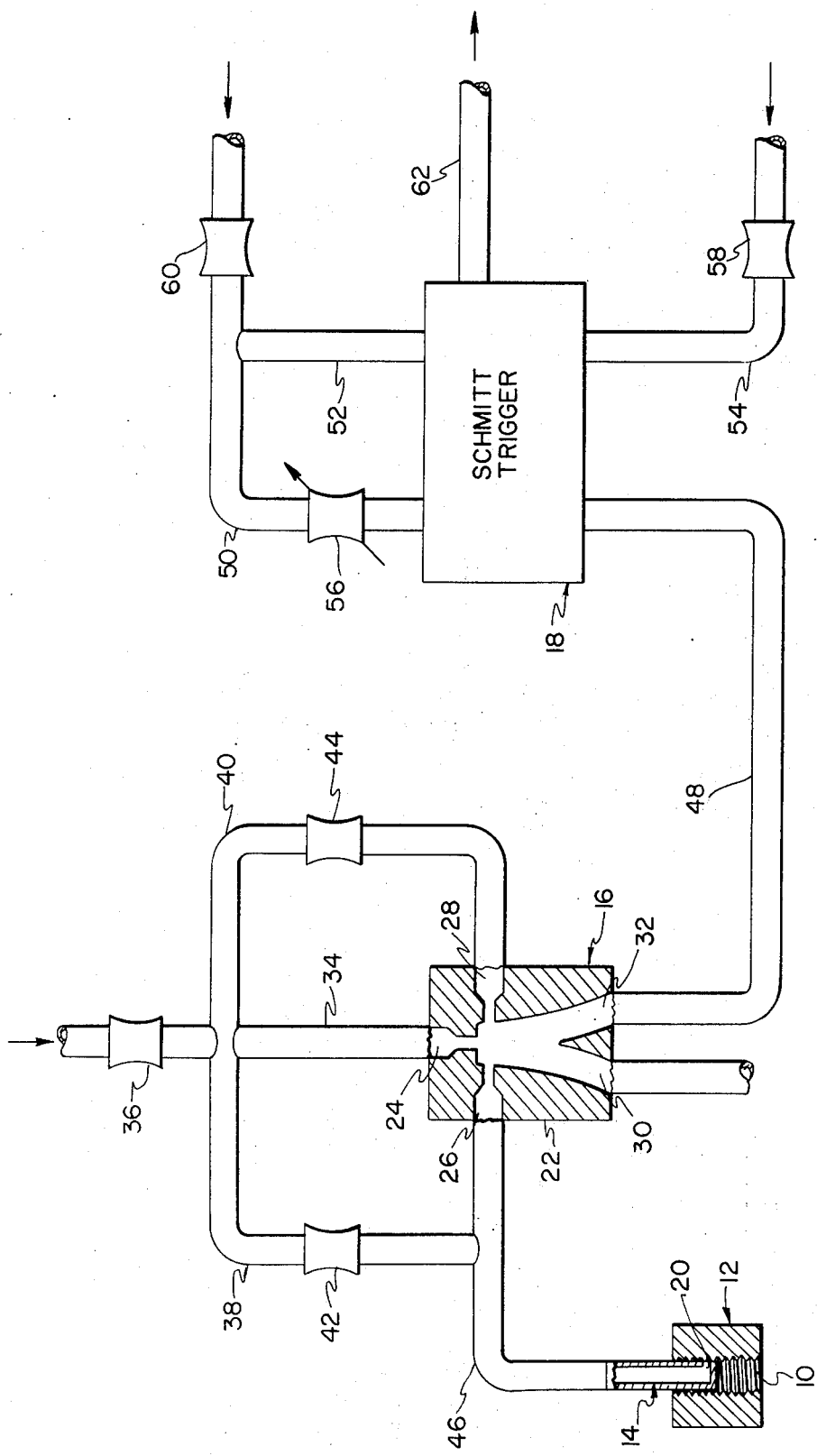
FIG. 1 is a schematic diagram of a screw thread sensing device according to the present invention.

The illustrated embodiment of the inventive thread sensing device shows it being used to determine the presence of threads in a bore 10 of a product unit 12. However, as mentioned above, the device is equally suitable for detecting the presence of threads on a stud when a suitable probe is utilized.

The device is formed by three elements, namely, probe 14, proportional center dump fluidic element 16, and fluidic Schmitt trigger 18. The illustrated probe 14 is positioned in bore 10 with a close fit and has a radially directed opening 20 in close proximity to the walls of the bore. The probe for detecting threads on a stud, which probe has not been illustrated, would simply be an open ended probe closely fitting over the stud to be examined. It is preferable for the above mentioned close fit to be a wiping or brushing contact between the probe and the surface being examined in order to obtain the most accurate results.

The proportional center dump fluidic element or proportional amplifier 16 is of a known type and includes a housing 22 having a supply port 24 and symmetrically arranged input ports 26, 28 and output ports 30, 32. The supply port 24 is connected to a source of pressurized fluid (not shown) through filtering means (also not shown) by conduit 34 having a calibrated fixed restrictor 36 therein. Conduits 38 and 40, including fixed restrictors 42 and 44, respectively, are connected between conduit 34 and input ports 26 and 28, respectively. Conduit 46 connects probe 14 to conduit 38 and input port 26. Only one of the output ports 30, 32 is connected to an input port of the Schmitt trigger 18 through conduit 48 while the other output port is left open.

The fluidic Schmitt trigger 18 is also well known and has inputs from conduits 48, 50, 52 and 54. A variable restrictor 56 is connected in conduit 50 and a fixed restrictor 58 is connected in conduit 54. Conduits 50 and 52 are connected to a source of pressurized fluid (not shown) through fixed restrictor 60. Conduit 54 is likewise connected to the source. The output from the Schmitt trigger is taken at conduit 62. The fluidic Schmitt trigger has been shown schematically as a block but is a pneumatic switch with an adjustable trigger. It is an analog to digital device utilizing a series arrangement of three proportional amplifiers, a bistable device and a terminal OR-NOR stage.

Figure 2:
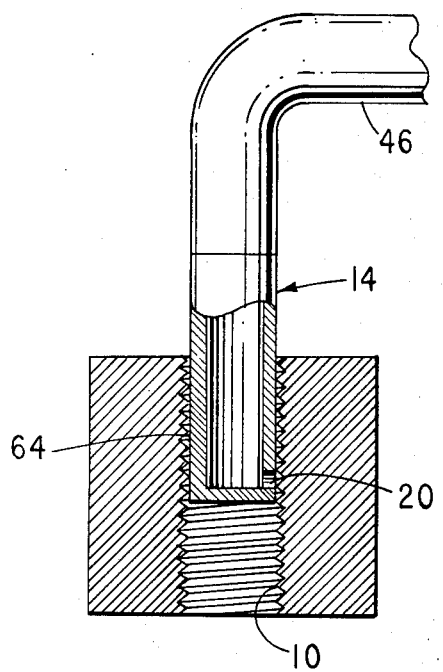
FIG. 2 is an enlarged section of a probe for use with the screw thread sensing device of FIG. 1 for sensing internal screw threads.
Figure 3:
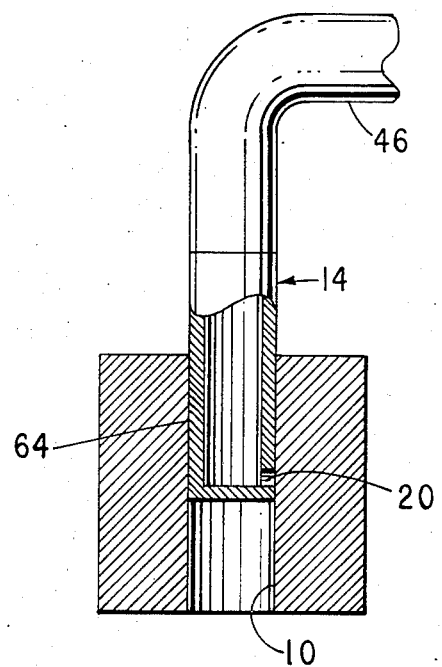
FIG. 3 is a section of the probe of FIG. 2 used with an unthreaded bore.

The probe 14 for sensing internal threads, as illustrated in FIG. 2, has an external cylindrical surface 64 for contacting the internal cylindrical surface of bore 10 such that the only substantial passage for fluid flow after exiting from a radially directed opening is through the grooves of the screw threads. The screw threads are cut into the internal surface of the bore 10; and, thus, the diameter of the external surface 64 of the probe is substantially the same as the diameter of the bore 10 prior to cutting of the screw threads therein such that if no screw threads are present in the bore, as shown in FIG. 3, the external surface 64 of the probe 14 will contact the unthreaded internal surface of the bore to substantially prevent fluid flow between the probe and the bore.

Figure 4:
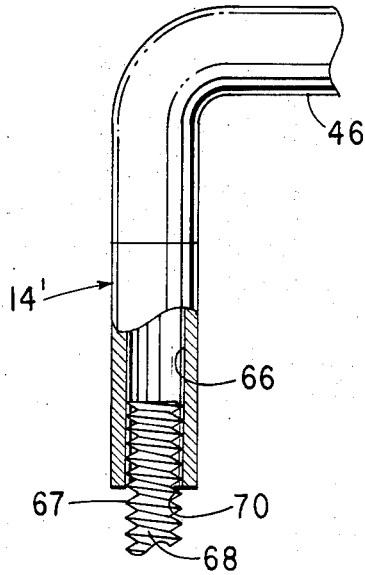
FIG. 4 is an enlarged section of a probe for use with the screw thread sensing device of FIG. 1 for sensing external screw threads.
Figure 5:
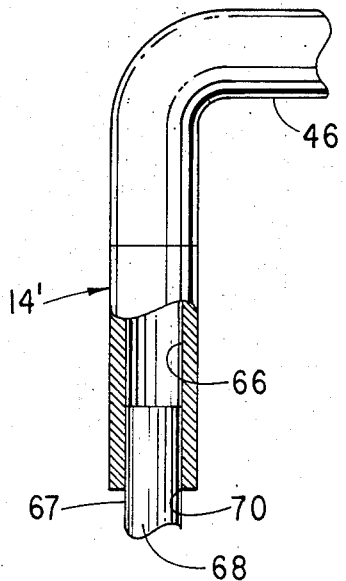
FIG. 5 is a section of the probe of FIG. 4 used with an unthreaded stud.

A probe 14' for sensing external threads is illustrated in FIGS. 4 and 5 and has an internal cylindrical surface 66 for contacting the external cylindrical surface 67 of a stud 68 with an axial opening 70 at the bottom of the probe. Accordingly, when a stud 68 to be examined is inserted in opening 70, the only substantial passage for fluid flow is through the grooves in the screw threads; and, similar to probe 14 if the stud 68 is unthreaded as shown in FIG. 5, the internal surface 66 of probe 14' will contact the unthreaded external surface 67 of the stud to substantially prevent fluid flow between the probe and the stud.

The thread senser operates basically as a back pressure senser as follows: pressurized fluid is fed to the proportional element 16 through conduits 34, 38 and 40. Some of the pressurized fluid also flows through conduit 46 to probe 14 and out through opening 20 for sensing internal threads or to probe 14' and out through opening 70 for sensing external threads. The element 16 is balanced in this condition so that the flow and pressure at the output ports 30 and 32 is equal. As long as the opening of the probe is not blocked, the pressurized fluid will flow out of the bore via the grooves of the threads. The system will thus be in a balanced condition with no output.

When the probe 14 is inserted into an unthreaded bore, the flow of fluid from opening 20 will be restricted causing a back pressure to build up. This back pressure will be fed to input port 26 and cause the proportional amplifier to become unbalanced. In this condition a greater fluid flow and pressure will appear at output port 32 than at output port 30. The increased output from port 32 will be sensed by the Schmitt trigger 18 and amplified to produce an output signal indicating that the surface being tested does not have threads. Similarly, when the probe 14' is positioned over an unthreaded stud, the flow from opening 70 will be restricted to increase the back pressure and produce an output signal indicating an absence of threads.

It is preferable for the pressurized fluid fed to this system to be filtered to 5 microns and to be as oil free as possible. The means for accomplishing this filtering are well known and therefore have not been shown. However, this filtering step is rather important for all fluidic systems of this general type since the elements themselves have small orifices which could be easily obstructed if the pressurized fluid is not clean and oil free. Likewise the fluidic elements should be protected from ambient air borne dust and debris which might impede proper flow through the system.

The thread sensor may be calibrated by attaching an indicator or pressure guage to the output 62 of the Schmitt trigger 18. Clean, oil free air should be fed to the system at a pressure of approximately 10 PSI. At this time the indicator or gauge could have any reading. The probe should be properly positioned with respect to a known sample, either threaded or unthreaded, and the variable restrictor 56 adjusted for the correct output reading. This step may have to be repeated several times to insure the proper setting of the variable restrictor 56.

The above described embodiment is intended to be illustrative only and not to limit the scope of the invention which may have many modifications and embodiments within the spirit of the invention.

What is claimed is:

1. A method for determining the presence or absence of screw threads on a surface comprising the steps of
    directing a fluid toward the surface such that the only substantial passage for the fluid is through the grooves of the screw threads; and
    sensing the back pressure of the fluid directed toward the surface to determine the presence or absence of screw threads on the surface.

2. A method according to claim 1 wherein said sensing step includes balancing a fluidic system for a back pressure existing when screw threads are present on the surface and unbalancing the fluidic system when the back pressure increases above the balanced back pressure in response to the absence of screw threads on the surface.

3. A method according to claim 1 wherein the surface is an internal cylindrical surface and said fluid directing step includes positioning an outer cylindrical surface of a probe having a radially directed opening in wiping contact with the internal surface and supplying fluid to the probe.

4. A method according to claim 1 wherein the surface is an external cylindrical surface and said fluid directing step includes positioning a cylindrical internal surface of a probe in wiping contact with the external surface and supplying fluid to the probe.

5. A fluidic device for determining the presence or absence of screw threads on a surface, comprising
    fluidic probe means having surface means for contacting the surface to be examined such that grooves of the screw threads provide the only substantial passage for fluid and means for directing a flow of pressurized fluid toward the surface to be examined; and
    means for sensing back pressure developed at said probe means whereby an increase in back pressure indicates the absence of screw threads 6. A fluidic device according to claim 5 wherein said sensing means includes a proportional center dump fluidic element.

7. A fluidic device according to claim 6 wherein said sensing means includes a fluidic Schmitt trigger connected to amplify an output of said fluidic element.

8. A fluidic device according to claim 7 wherein said surface means of said probe means is an external cylindrical surface and said fluid directing means includes a radially directed opening in said external surface.

9. A fluidic device according to claim 7 wherein said surface means of said probe means is an internal cylindrical surface and said fluid directing means includes an axially directed opening in said probe means.

* * * * *